United States Patent [19]
Woerner et al.

[11] Patent Number: 5,975,261
[45] Date of Patent: Nov. 2, 1999

[54] ARRANGEMENT OF A 2-PATH TORSION DAMPER UNIT AND A CLUTCH IN A HYDRODYNAMIC TORQUE CONVERTER

[75] Inventors: Otto Woerner, Reutlingen; Heinz Schultz, Hochdorf, both of Germany

[73] Assignee: DaimlerChrysler AG, Stuttgart, Germany

[21] Appl. No.: 09/094,671

[22] Filed: Jun. 15, 1998

[30] Foreign Application Priority Data

Jun. 13, 1997 [DE] Germany ................ 197 24 973

[51] Int. Cl.⁶ .................................................. F16H 45/02
[52] U.S. Cl. .................................. 192/3.29; 192/212
[58] Field of Search .............................. 192/3.29, 3.3, 192/55.61, 212

[56] References Cited

U.S. PATENT DOCUMENTS

| | | | |
|---|---|---|---|
| 4,949,822 | 8/1990 | Martin | 192/3.3 |
| 5,129,493 | 7/1992 | Edmunds | 192/3.28 X |
| 5,400,884 | 3/1995 | Matsuoka | 192/3.3 X |
| 5,533,602 | 7/1996 | Woerner et al. | 192/3.29 |
| 5,771,998 | 6/1998 | Olsen et al. | 192/3.29 |

FOREIGN PATENT DOCUMENTS

| | | |
|---|---|---|
| 0 732 527 | 9/1996 | European Pat. Off. . |
| 195 14 411 | 11/1995 | Germany . |
| 2 202 309 | 9/1988 | United Kingdom . |

*Primary Examiner*—Rodney H. Bonck
*Attorney, Agent, or Firm*—Evenson, McKeown, Edwards & Lenahan, PLLC

[57] ABSTRACT

In the case of an arrangement of a 2-path torsion damper unit and a friction disk clutch in a hydrodynamic torque converter, a coupling member for the torque transmission from the clutch to the torsion damper unit as well as the latter are fixed in their position with respect to the hub of a turbine wheel, particularly for avoiding wobbling.

14 Claims, 5 Drawing Sheets

ARRANGEMENT OF A 2-PATH TORSION DAMPER UNIT AND A CLUTCH IN A HYDRODYNAMIC TORQUE CONVERTER

BACKGROUND AND SUMMARY OF THE INVENTION

The invention relates to an arrangement of a 2-path torsion damper unit and a friction disk clutch in a hydrodynamic torque converter. In such an arrangement, one path of the torque transmission leads from the clutch to the torsion damper unit—while the other path is laid from the turbine wheel to the torsion damper unit, from which in both cases the torque is delivered to the output shaft.

In a known arrangement of the above-mentioned type, such as German Patent document DE 195 14 411 A1; FIGS. 1 to 3, the hub of the turbine wheel has an axial driving serration on its inner circumference, into which a corresponding driving serration on the outer circumference of the hub of the secondary damper part engages with a defined circumferential backlash. This is done in order to, on the one hand, permit the torsional path of the torsion damper unit and, on the other hand, in the conversion range, protect the torsion damper unit from high torques. The clutch only has a single friction disk which cooperates with a friction surface of the housing shell and is constructed in one piece with a ring-disk-shaped piston. For the torque transmission from the clutch to the primary damper part, a coupling member is selected in the form of a ring disk which either interacts as a separate component with the outer circumference of the ring disk by means of a loose drive-type connection and has a riveted connection with the outer shell of the turbine wheel as well as with the primary damper part or, as a damper disk of the primary damper part which has higher dimensions with respect to its wall thickness, has on its outer circumference a loose drive-type connection with the radially exterior area of the piston and is connected on its inner circumference by corresponding axial driving serrations with the hub of the turbine wheel. Measures for counteracting the wobbling, on the one hand, of the friction disk piston component with respect to the housing shell and, on the other hand, of the secondary damper part with respect to the turbine wheel, are not provided in this known arrangement.

From European Patent document EP 0 732 527 A2, a different type of arrangement is known for a 2-path torsion damper unit and a friction disk clutch in a housing shell of a hydrodynamic torque converter. In this arrangement, the clutch is operatively connected with the hub of the hub-shaft connection of the output shaft by means of a torsion damper assigned to it and arranged radially on the outside with respect to the axis of rotation of the converter, and the turbine wheel is operatively connected with the hub of the hub-shaft connection of the output shaft by means of a torsion damper assigned to it which is arranged radially on the inside. On its inner circumference, the secondary damper part of the turbine-side torsion damper is riveted to the hub and, on its outer circumference, is connected by means of driving devices with the secondary damper part of the clutch-side torsion damper. While the piston is constructed in one piece with the single friction disk of the clutch and, in the engaged condition, hydraulic working medium therefore cannot flow through the clutch for the cooling, the outer shell of the turbine wheel is riveted on its inner circumference with a ring flange constructed as a sheet steel stamping. This ring flange is constructed on its outer circumference as a primary damper part of the pertaining torsion damper and is supported in the area of its inner circumference in one direction of the axis of rotation of the converter by way of a stop disk with respect to the hub and in the opposite direction by way of a roller bearing with respect to an overriding clutch of the stator of the torque converter. Radially on the outside with respect to this support, driving devices of the hub engage with a predetermined circumferential backlash in window openings of the ring flange in order to protect the springs of the turbine-side torsion damper from excessive torques. Also in the case of this known arrangement, no measures are provided which could attempt to avoid the wobbling explained with respect to the state of the art on which this application is based.

The object on which the invention is based is essentially that of avoiding the above-mentioned wobbling which occurs in the known arrangements.

This, and other objects, are achieved according to the present invention by an arrangement of a 2-path torsion damper unit and a friction disk clutch in a housing shell of a hydrodynamic torque converter. The housing shell, which can be driven by a driving engine and is non-rotatably connected with the outer shell of a pump impeller, accommodates a turbine wheel with a hub which is immobile with respect to the latter. The torsion damper unit has a primary damper part and a secondary damper part which are connected with one another in a torsionally elastic manner by means of torsion springs. The primary damper part can be connected by way of the clutch with the housing shell, and the secondary damper part can be connected by means of a releasable form-locking shaft-hub connection with an output shaft which is coaxial with respect to the central axis of the torque converter. The turbine wheel has a play-free connection with the primary damper part as well as a rotational mobility with respect to the secondary damper part limited by driving devices. The two hubs of the turbine wheel and of the secondary damper part are mutually supported transversely to the central axis by a radial bearing and are mutually supported in the directions of the central axis by way of one axial bearing respectively. The play-free connection between the turbine wheel and the primary damper part as well as the receiving devices for limiting the rotational mobility between the turbine wheel and the secondary damper part with respect to the central axis are arranged radially on the outside with respect to the bearings of the two hubs.

The description herein contains further advantageous developments of the invention.

Other objects, advantages and novel features of the present invention will become apparent from the following detailed it description of the invention when considered in conjunction with the accompanying drawings.

DETAILED DESCRIPTION OF THE DRAWINGS

Figure 1:
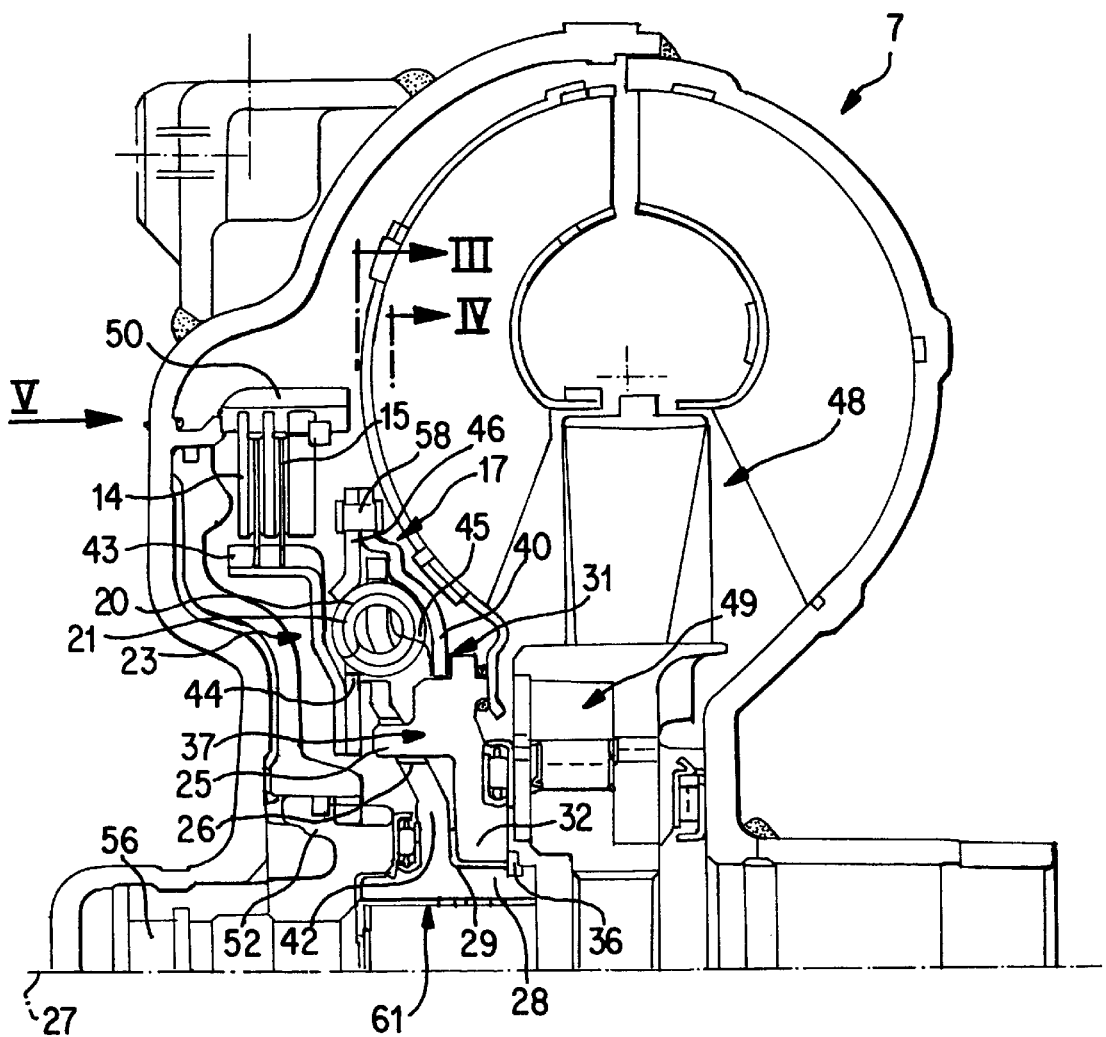
FIG. 1 is half of an axial sectional view of a hydrodynamic torque converter with an arrangement according to the invention which essentially consists of a 2-path torsion damper unit and a friction disk clutch, the section extending through a plane containing the central axis of the torque converter and being bounded by this central plane.
Figure 2:
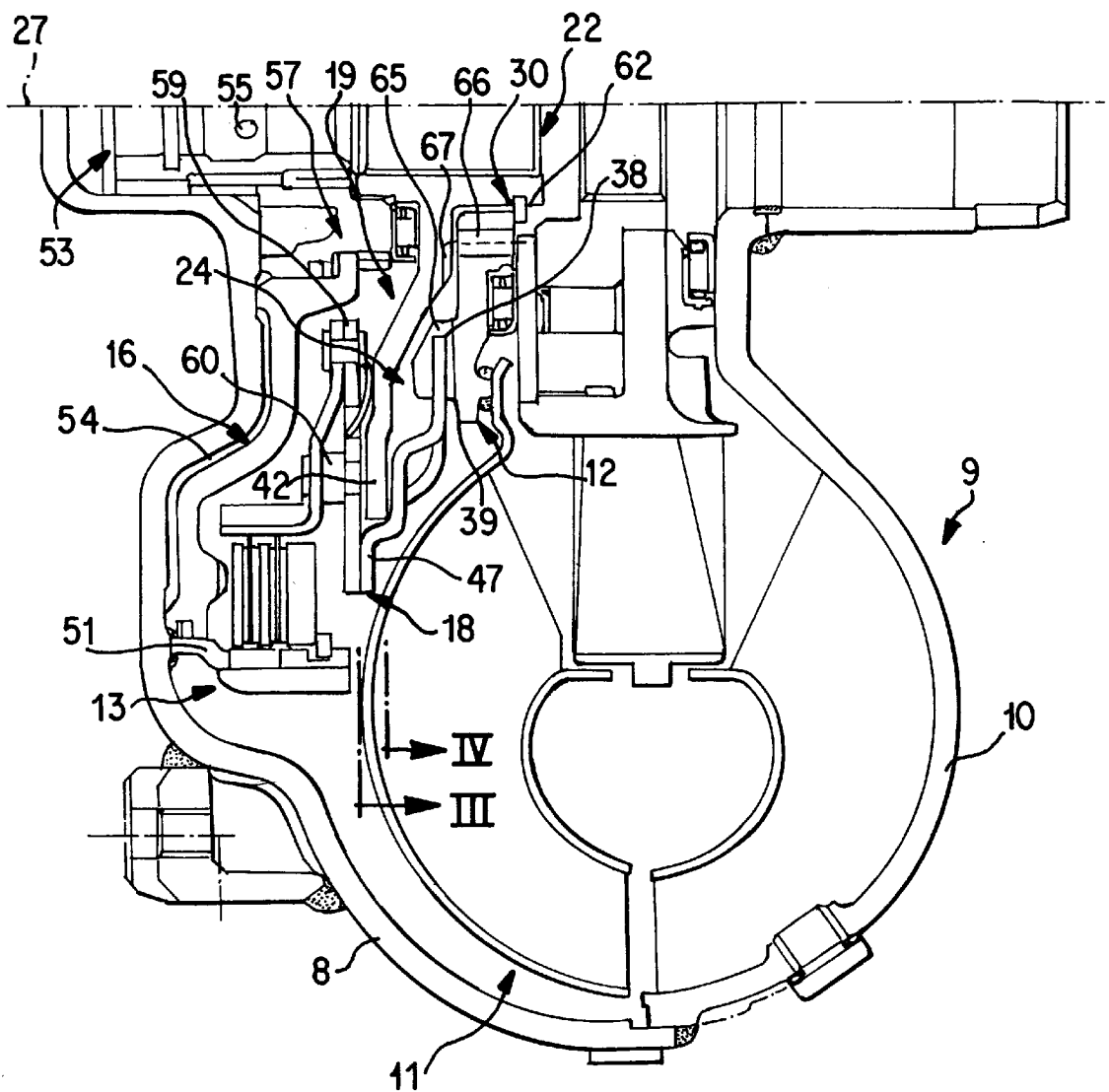
FIG. 2 is the complementary half of the axial sectional view of FIG. 1.
Figure 3:
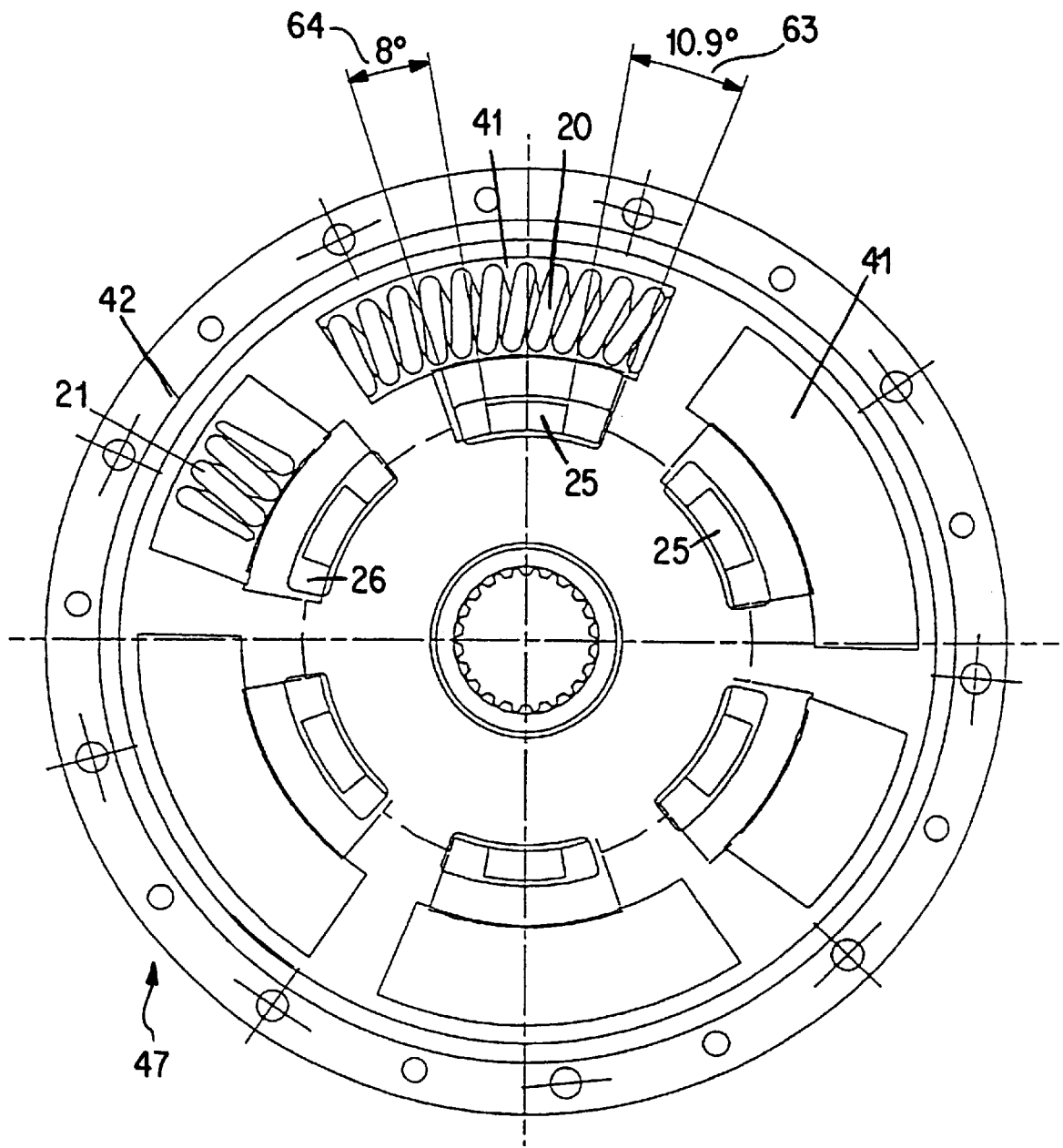
FIG. 3 is a cross-sectional view of the torque converter in FIG. 1 in an axis-of-rotation-normal plane taken along Line III—III from FIGS. 1 and 2.
Figure 4:
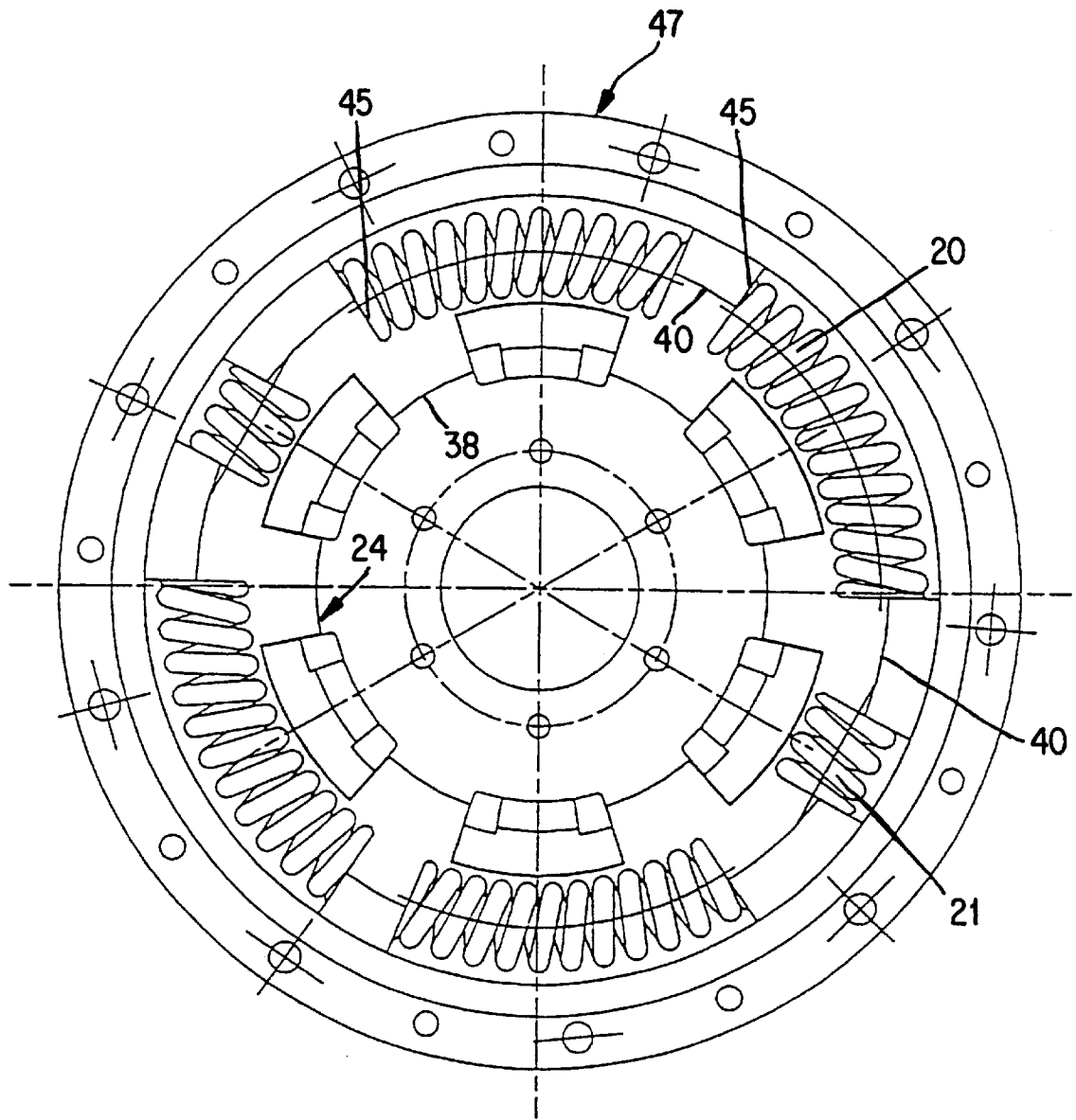
FIG. 4 is a cross-sectional view of the torque converter of FIG. 1 in an axis-of-rotation-normal plane taken along Line IV—IV of FIGS. 1 and 2.

Referring to FIGS. 1 and 2, a torque converter 7 has a housing shell 8 which can be driven in the conventional manner by a driving engine and which is connected with the outer shell 10 of a pump impeller 9 in a non-rotatable and liquid-tight manner. The hydrodynamic flow circulation generated by the pump impeller 9 is still maintained by a turbine wheel 11 and a stator 48, in which case the stator 48 can support itself by way of an overriding clutch 49 on a non-rotating stator shaft of a transmission housing in the conversion range. The housing shell 8 accommodates a multi-disk clutch 13 and a 2-path torsion damper unit 17. An outer-disk carrier 50 holding the outer disks 14 of the multi-disk clutch 13 is constructed in one piece with a ring cylinder 51 arranged concentrically with respect to the central axis 27-27 of the torque converter 7 and is rigidly connected with the housing shell 8. In the ring cylinder 51, a ring-shaped axial piston 16 for operating the clutch 13 is guided on its outer circumference in a compression-resistant and displaceable manner and is guided on its inner circumference in a compression-resistant and displaceable manner on another ring cylinder 52 concentric with respect to the central axis 27—27. The ring cylinder 52 is constructed in one piece with a rotationally symmetrical bearing insert 53 which is arranged centrically with respect to the central axis 27—27 and in an immobile manner with respect to the housing shell 8. The bearing insert 53 has a central opening 56 as well as radial bores 55 communicating with the central opening 56. Together with the housing shell 8, the axial piston 16 encloses a working pressure chamber 54 for acting upon the piston by means of pressure, which working pressure chamber 54 communicates with the radial bores 55. By means of an axial driving serration 57, the axial piston 16 is non-rotatably and axially displaceably fixed on its inner circumference with respect to the bearing insert 53 and thus with respect to the housing shell 8.

The 2-path torsion damper unit 17 has a primary damper part 18 and a secondary damper part 19, these damper parts being connected with one another by means of torsion springs 20, 21 in a torsionally elastic manner. The primary damper part 18 has two ring-shaped damper disks 46 and 47 which are arranged on both sides of a ring-shaped damper disk 42 of the secondary damper part 19, which damper disks 46 and 47 are firmly connected with one another by rivets 58. The damper disk 46 which faces the clutch 13 is firmly connected by rivets 59 and 60 with a ring-shaped coupling member 23, which is arranged concentrically with respect to the central axis 27—27 and is connected in one piece with an inner-disk carrier 43, on which the inner disks 15 of the clutch 13 are held in a non-rotatable and axially displaceable manner.

Figure 5A:
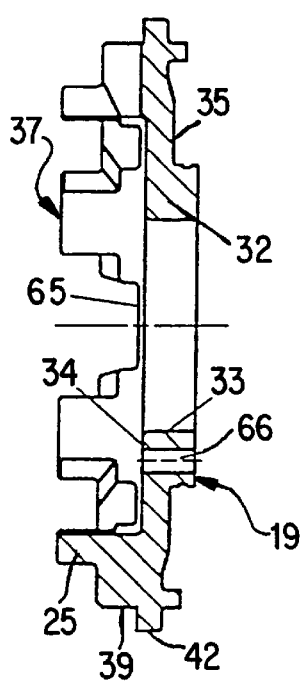
FIG. 5a is an axial sectional view of the secondary damper part of FIG. 5 according to Line Va—Va of FIG. 5.
Figure 5:
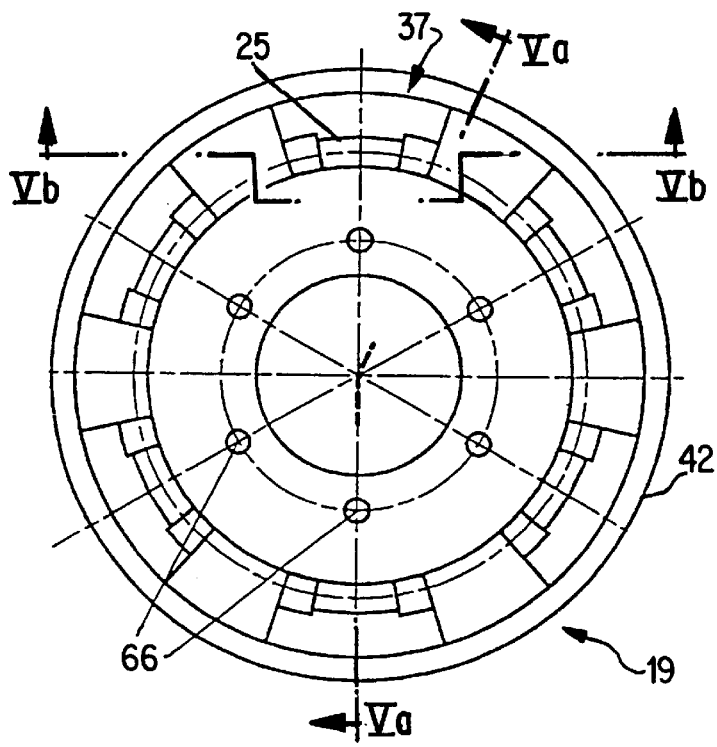
FIG. 5 is a lateral view in the direction of the arrow V of FIG. 1 of the secondary damper part of the 2-path torsion damper unit of FIG. 1 as a piece part.
Figure 5B:
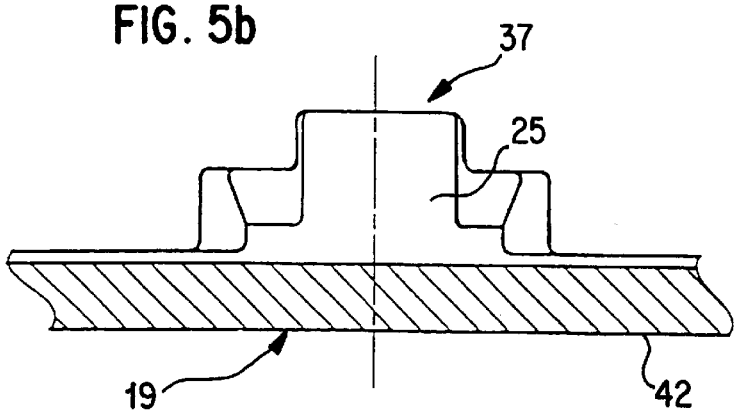
FIG. 5b is an axial sectional view of the secondary damper part of FIG. 5 according to Line Vb—Vb of FIG. 5.

The damper disk 42 of the secondary damper part 19 is constructed in one piece with a sleeve-shaped hub 22 which is provided on its inner circumference with an axial driving serration 61 for the non-rotatable connection with an output shaft coaxial to the central axis 27—27. The hub 22 has a bearing projection 62 on which a bearing ring 32 is supported transversely to the central axis 27—27 by a radial bearing 28 and is supported in the directions of the central axis 27 by one axial bearing 29 and 30 respectively. The bearing ring 32 provided with corresponding bearing surfaces 33 to 35 (FIG. 5a) is in one piece with a ring-shaped hub 12 which is arranged centrically with respect to the central axis 27—27 and is rigidly connected with the outer shell of the turbine wheel 11 by means of welded connections. While the bearing part of the bearing projection 62 supporting the bearing ring 32 in the direction pointing to the housing shell 8 is formed by a face of the damper disk 42, a bearing part in the form of a securing ring 36, which is detachable with respect to the bearing projection 62, is used for supporting the bearing ring 32 in the opposite direction, in order to facilitate the mounting as well as the construction of the 2-path torsion damper unit 17 as a preassembled constructional unit.

For the arrangement and holding of the torsion springs 20, 21 in the circumferential directions with respect to the primary damper part 18, one damper disk 46 has longer window-type openings 44 for the longer torsion springs 20 and not shown shorter window-type openings 44a for the shorter torsion springs 21, and the other damper disk 47 has spring stops 45 arranged at a larger distance as well as spring stops 45a arranged at a shorter distance.

The longer torsion springs 20 engage in the circumferential directions essentially without play in window-type openings 41 of the damper disk 42, while the shorter torsion springs 21 engage in window-type openings 41a of the damper disk 41 in both circumferential directions with a respective circumferential backlash.

In an area situated between the torsion springs 20, 21, on the one hand, and the bearing ring 32, on the other hand, the hub 12 of the turbine wheel 11 is provided with axial extensions 37 which point to the housing shell 8 and from which finger-type axial driving devices 25 lead away which engage with play in window-type openings 26 of the damper disk 42, in which case, in both circumferential directions, the driving devices 25 have a circumferential backlash 63, 64 with respect to the openings 26 which permits a deflection of the torsion springs 20, 21 but prevents the deflection to a blocking.

Between the turbine wheel 11 and the primary damper part 18, a non-rotatable connection 24 is created in that the damper disk 47 is provided with radially interior tongue-type driving devices 38 which engage in a form-locking manner in corresponding axial recesses 65—which are provided in the circumferential direction between the extensions 37—of the hub 12 of the turbine wheel 11.

An additional centering device 31 is arranged between the 2-path torsion damper unit 17 and the turbine wheel 11. For this purpose, the damper disk 47 is provided with radially inwardly projecting tongue-type centering projections 40 which interact in each case with a cylindrical centering surface 39, which is centric with respect to the central axis 27—27, on the outer circumference of a respective projection 37 of the hub 12 of the turbine wheel 11.

The bearing ring 32 of the hub 12 of the turbine wheel 11 is penetrated by axial bores 66 which each communicate on their bore end facing the housing shell 8 with a pertaining pocket-shaped recess 67 in the adjacent face of the damper disk 42 in order to return oil after the flow through the clutch 13. The recesses 67 extend in the circumferential directions of the central axis 27—27 by an extent corresponding to the circumferential backlash 63, 64. On their other bore end, the axial bores 66 are connected with return ducts connected to the pressure oil supply of the torque converter.

The bearings 28 to 30 and the centering device 31 contribute to achieving the object of avoiding a wobbling of the 2-path torsion damper unit 17.

By means of the separate construction of the axial piston 16 and the coupling member 23, a wobbling of the axial piston 16 is avoided and the use of a multi-disk coupling 13 is permitted through which a radial flow can take place for cooling purposes.

In the case of the non-rotatable connection 24 between turbine wheel 11 and the primary damper part 18, serrations (such as Hirth-type serrations) which are susceptible to disturbances are avoided, and therefore high-expenditure positioning measures with respect to the alignment in the circumferential direction of the driving devices 25, 26 for limiting the circumferential backlash of the 2-path torsion damper unit are eliminated.

As the result of the one-piece characteristic of the damper disk 42 and the hub 22, the constructional expenditures are reduced and the manufacturing is facilitated. The 2-path torsion damper unit 17 is constructed as a constructional unit which can be preassembled and which is easy to mount also by means of the securing ring 36.

By means of the arrangement of the driving devices 25, 26 radially on the outside with respect to the bearings 28 to 30, lower forces occur when limiting the circumferential backlash because these act on a large radius with respect to the central axis 27—27.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Arrangement of a 2-path torsion damper unit and a friction disk clutch in a housing shell of a hydrodynamic torque converter in which the housing shell, which is driven by a driving engine and is non-rotatably connected with an outer shell of a pump impeller, accommodates a turbine wheel with a hub which is immobile with respect to the turbine wheel, and the torsion damper unit has a primary damper part and a secondary damper part which are connected with one another in a torsionally elastic manner via torsion springs, the secondary damper part having a hub, and in which the primary damper part is connected by way of the clutch with the housing shell, and the secondary damper part is connected by a releasable form-locking shaft-hub connection with an output shaft which is coaxial with respect to a central axis of the torque converter, and in which the turbine wheel has a play-free connection with the primary damper part as well as a rotational mobility with respect to the secondary damper part limited by driving devices, wherein the two hubs, one of the turbine wheel and one of the secondary damper part are mutually supported transversely to the central axis by a radial bearing and are mutually supported in the directions of the central axis by way of one axial bearing respectively, and further wherein the play-free connection between the turbine wheel and the primary damper part as well as the driving devices for limiting the rotational mobility between the turbine wheel and the secondary damper part with respect to the central axis are arranged radially on the outside with respect to the bearings of the two hubs.

2. Arrangement according to claim 1, wherein the hub of the turbine wheel and the primary damper part is mutually fixed by an additional centering device.

3. Arrangement according to claim 1, wherein the hub of the turbine wheel is constructed in one piece with a radially interior centric bearing ring which has bearing surfaces of the hub.

4. Arrangement according to claim 1, wherein a bearing part having a bearing surface of the hub of the secondary damper part of one axial bearing is releasably arranged with respect to its hub.

5. Arrangement according to claim 1, wherein the hub of the turbine wheel has axial recesses which, in circumferential directions of the central axis, are in a play-free engagement with radial projections of the primary damper part.

6. Arrangement according to claim 5, wherein a finger-type driving device extends in the axial direction from an axial extension of the hub of the turbine wheel, which driving device engages in a window opening of the secondary damper part which is used as a corresponding driving device.

7. Arrangement according to claim 6, wherein the axial extension has a cylindrical centering surface on its outer circumference for a corresponding centering projection of the primary damper part.

8. Arrangement according to claim 1, wherein the hub of the secondary damper part and a ring-shaped damper disk having window openings for the engagement of the torsion springs are constructed in one piece with one another.

9. Arrangement according to claim 1, wherein the primary damper part is connected by a coupling member with the clutch which is operable by a piston, and the coupling member is constructed separately with respect to the piston and is arranged in a freely movable manner.

10. Arrangement according to claim 9, wherein the coupling member and an inner-disk carrier of the clutch are constructed in one piece with one another.

11. Arrangement according to claim 10, wherein the coupling member is connected with one of two ring-shaped damper disks of the primary damper part which are arranged on both sides of the damper disk of the secondary damper part and have spring stop devices for the torsion springs, and further wherein the other damper disk of the primary damper part has projections for the play-free connection as well as the centering projections for the additional fixing in each case with respect to the hub of the turbine wheel.

12. Arrangement according to claim 9, wherein the coupling member is connected with one of two ring-shaped damper disks of the primary damper part which are arranged on both sides of the damper disk of the secondary damper part and have spring stop devices for the torsion springs, and further wherein the other damper disk of the primary damper part has projections for the play-free connection as well as the centering projections for the additional fixing in each case with respect to the hub of the turbine wheel.

13. Arrangement according to claim 1, wherein the hub of the turbine wheel is provided with axial passages in an area of its bearing, which axial passages at their respective end facing the housing shell radially overlap pocket-shaped recesses of the damper disk of the secondary damper part.

14. A 2-path torsion damper unit and friction disk clutch arrangement of a hydrodynamic torque converter, comprising:

a turbine wheel having a turbine hub;

a primary damper part and a secondary damper part connected with one another, said secondary damper part having a secondary hub;

a radial bearing and first and second axial bearings, said radial bearing mutually supporting the turbine hub and the secondary hub transversely to a central axis of the torque converter, and said first and second axial bearings mutually supporting the turbine hub and secondary hub in axial directions of the central axis;

driving devices which limit a rotational mobility between the turbine wheel and the secondary damper part with respect to the central axis;

a coupling which is play-free, along with the driving devices, being arranged radially on the outside with respect to the radial bearing and the first and second axial bearings between the turbine wheel and the primary damper part.

* * * * *